(12) United States Patent
Xie et al.

(10) Patent No.: US 7,686,942 B2
(45) Date of Patent: Mar. 30, 2010

(54) METHOD FOR PREPARATION OF ETHYLENE AND PROPYLENE BY CATALYTIC CRACKING USING A FLUID-BED CATALYST

(75) Inventors: Zaiku Xie, Shanghai (CN); Hui Yao, Shanghai (CN); Weimin Yang, Shanghai (CN); Guangwei Ma, Shanghai (CN); Jingxian Xiao, Shanghai (CN); Liang Chen, Shanghai (CN)

(73) Assignees: Shanghai Research Institute of Petrochemical Technology Sinopec, Shanghai (CN); China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 12/365,146

(22) Filed: Feb. 3, 2009

(65) Prior Publication Data

US 2009/0137857 A1 May 28, 2009

Related U.S. Application Data

(63) Continuation of application No. 11/503,925, filed on Aug. 15, 2006.

(30) Foreign Application Priority Data

| Aug. 15, 2005 | (CN) | ............ | 2005 1 0028795 |
| Aug. 15, 2005 | (CN) | ............ | 2005 1 0028796 |
| Aug. 15, 2005 | (CN) | ............ | 2005 1 0028797 |
| Aug. 15, 2005 | (CN) | ............ | 2005 1 0028798 |

(51) Int. Cl.
*C10G 11/00* (2006.01)

(52) U.S. Cl. ............ 208/108; 208/106; 208/113; 208/111.1; 208/111.15; 208/111.3; 208/111.35; 502/300

(58) Field of Classification Search ......... 208/106–108, 208/113, 111.1, 111.15, 111.35, 111.3; 502/300
See application file for complete search history.

(56) References Cited

U.S. PATENT DOCUMENTS

| 4,620,051 | A | | 10/1986 | Kolts et al. |
| 4,705,769 | A | | 11/1987 | Kolts et al. |
| 4,853,358 | A | * | 8/1989 | Schramm et al. ............ 502/167 |
| 6,867,341 | B1 | | 3/2005 | Abrevaya et al. |
| 2002/0094931 | A1 | * | 7/2002 | Wang et al. ............ 502/63 |
| 2002/0115879 | A1 | | 8/2002 | Hinago et al. |
| 2002/0133044 | A1 | * | 9/2002 | Chaturvedi et al. ......... 562/546 |
| 2003/0036670 | A1 | * | 2/2003 | Oh et al. .............. 585/400 |

FOREIGN PATENT DOCUMENTS

| CN | 1317546 A | 10/2001 |
| CN | 1480255 A | 3/2004 |

OTHER PUBLICATIONS

Definition of Composite, dictionary.com, Random House Dictionary, Inc. 2006.

* cited by examiner

*Primary Examiner*—Jessica L. Ward
*Assistant Examiner*—Erin B Saad
(74) *Attorney, Agent, or Firm*—Birch, Stewart, Kolasch & Birch, LLP.

(57) ABSTRACT

A method for preparation of ethylene and propylene by catalytic cracking using a fluid-bed catalyst. The main technical problems to be solved are a relatively high reaction temperature, and low activities and poor selectivities of the catalyst at a low temperature, during the reaction for preparing ethylene and propylene by catalytically cracking naphtha. The fluid-bed catalyst is a composition of the chemical formula $Mo_{1.0}V_aA_bB_cC_dO_x$ based on stoichiometric ratio. The method using the fluid-bed catalyst has satisfactorily solved the above-mentioned problems, and is useful in the industrial production of ethylene and propylene by catalytically cracking naphtha.

9 Claims, No Drawings

METHOD FOR PREPARATION OF ETHYLENE AND PROPYLENE BY CATALYTIC CRACKING USING A FLUID-BED CATALYST

CROSS-REFERENCE TO RELATED APPLICATIONS

This application is a Continuation of co-pending U.S. application Ser. No. 11/503,925 filed on Aug. 15, 2006, and China Patent Application Nos. 200510028795.8, 200510028796.2, 200510028797.7, and 200510028798.1, all of which filed on Aug. 15, 2005 on which priority is claimed under 35 U.S.C. §120, the entire contents of which are hereby incorporated by reference.

BACKGROUND OF THE INVENTION

1. Field of the Invention

The present invention relates to using a fluid-bed catalyst for the preparation of ethylene and propylene by catalytic cracking, and in particular, using a fluid-bed catalyst for the preparation of ethylene and propylene by catalytically cracking naphtha.

2. Description of Background Art

Currently, steam thermocracking is the most popular method for preparing ethylene and propylene, and naphtha is the raw material used most frequently. However, steam pyrolysis of naphtha has the disadvantages including a high reaction temperature, strict process conditions, high requirements for devices, especially furnace pipe materials, a large amount of $CO_2$ that is released and big loss. It has become an issue attracting more and more attention to seek a suitable cracking catalyst, which does not effect the above disadvantages.

In the patents U.S. Pat. Nos. 4,620,051 and 4,705,769 of Royal Philips Electronics (US), an oxide catalyst comprising manganese oxide or ferric oxide as the active component, the rare earth element La and the alkaline earth metal Mg is used for cracking $C_3$ and $C_4$ raw materials. The $Mn,Mg/Al_2O_3$ catalyst is put in a fixed-bed reactor in a laboratory, the temperature is 700° C., the mol ratio of water to butane is 1:1, the butane conversion may reach 80%, and the ethylene and propylene selectivities are 34% and 20%, respectively. It is alleged in said two patents that naphtha and fluid-bed reactors are also usable.

The patent CN1317546A of Enichem SPA (IT) relates to a catalyst of the chemical formula $12CaO.7Al_2O_3$ for steam pyrolysis reactions. The raw material may be naphtha, the operational temperature is from 720 to 800° C., the pressure is from 1.1 to 1.8 atm, the contact time is from 0.07 to 0.2 second, and the ethylene and propylene yield may reach 43%.

In the patent USSR Pat1298240.1987 (USSR), $Zr_2O_3$ supported on a pumacite or ceramic is used, the temperature is from 660 to 780° C., the space velocity of the moderate device is from 2 to 5 h$^{-1}$, the weight ratio of water to naphtha is 1:1. The raw materials are N-paraffin $C_{7-17}$, cyclohexane and straight gasoline, the ethylene yield may reach 46% and the propylene yield may reach 8.8%.

The patent CN1480255A (CN) introduces an oxide catalyst for the preparation of ethylene and propylene by catalytically cracking the raw material naphtha at a temperature of 780° C., wherein the ethylene and propylene yield may reach 47%.

To sum up, the current technology of preparation of ethylene and propylene by catalytic cracking requires a relatively high reaction temperature, but the yields of ethylene and propylene are not remarkably increased.

SUMMARY AND OBJECTS OF THE INVENTION

The technical problems to be solved by the present invention are to remove the disadvantages of the prior catalytic cracking technology, including a high reaction temperature, and low activities and poor selectivities of the catalyst at a low temperature. The present invention provides a novel fluid-bed catalyst for the preparation of ethylene and propylene by catalytic cracking. Said catalyst has the advantages of a low reaction temperature, superior catalytic activities, and high selectivity for ethylene and propylene.

In order to solve the above technical problems, the present invention employs the following technical solution: a fluid-bed catalyst for the preparation of ethylene and propylene by catalytic cracking, said fluid-bed catalyst comprising a support selected from at least one of $SiO_2$, $Al_2O_3$, molecular sieves and composite molecular sieves, and a composition of the following chemical formula based on stoichiometric ratio:

$$Mo_{1.0}V_aA_bB_cC_dO_x,$$

wherein A is selected from at least one element of Groups VIII, IB, IIB, VIIB, VIIB, IA and IIA;

B is selected from at least one of rare earth elements;

C is selected from at least one of Bi and P;

a is from 0.01 to 0.5;

b is from 0.01 to 0.5;

c is from 0.01 to 0.5;

d is from 0 to 0.5; and

X represents the total number of oxygen atoms that meets the valances of the elements in the catalyst, wherein the molecular sieve is at least one of ZSM-5, Y, β, MCM-22, SAPO-34 and mordenite, and the composite molecular sieve is a composite grown together from at least two molecular sieves of ZSM-5, Y, β, MCM-22, SAPO-34 and mordenite, and wherein the amount of the catalyst support as used is from 20 to 80% by weight on the basis of the weight of the catalyst.

In this technical solution, a is preferably from 0.01 to 0.3, b is preferably from 0.01 to 0.3, c is preferably from 0.01 to 0.3 and d is preferably from 0.01 to 0.3. The element of Group VIII is preferably selected from at least one of Fe, Co and Ni, the element of Group IB is preferably selected from at least one of Cu and Ag, the element of Group IIB is preferably Zn, the element of Group VIIB is preferably selected from at least one of Mn and Re, the element of Group VIB is preferably selected from at least one of Cr, Mo and W, the element of Group IA is preferably selected from at least one of Li, Na and K, and the element of Group IIA is preferably selected from at least one of Ca, Mg, Sr and Ba. The rare earth element is preferably selected from at least one of La and Ce. When Cr is a component of the catalyst, the ratio of Mo:Cr is 1:0.01 to 0.5 based on stoichiometric ratio. In a preferred catalyst support, the molecular sieve is selected from at least one of ZSM-5, Y zeolite, mordenite and β zeolite, and the composite molecular sieve is selected from at least one of ZSM-5/mordenite, ZSM-5/Y zeolite and ZSM-5/β zeolite. The silica-alumina mol ratios, $SiO_2/Al_2O_3$, of said molecular sieve and said composite molecular sieve are from 10 to 500, preferably from 20 to 300. The amount of the catalyst support as used is preferably from 30 to 50% by weight on the basis of the weight of the catalyst.

The fluid-bed catalyst of the present invention for the preparation of ethylene and propylene by catalytic cracking is useful for catalytically cracking heavy oil, light diesel oil, light gasoline, catalytically cracked gasoline, gas oil, condensate oil, $C_4$ olefin or $C_5$ olefin.

The catalyst of the present invention is prepared by the following process: the raw material Mo is from ammonium molybdate or phospho-molybdic acid, V is from ammonium metavanadate or vanadium pentoxide, Bi is from bismuth nitrate, A elements are from the corresponding nitrate, oxalate, acetate, oxide or soluble halide, B elements are from the corresponding nitrate, oxalate, acetate, oxide or soluble halide, and phosphorus is from phosphoric acid, triammonium phosphate, diammonium phosphate, ammonium biphosphate; the catalyst is shaped by heating and refluxing a slurry comprising the component elements and a support in a water bath at a temperature of 70 to 80° C. for 5 hours, spray drying the slurry, and sintering the resultant powder in a muffle furnace at a temperature of 600 to 750° C. for 3 to 10 hours.

In the present invention, a series of transition metals and rare earth metals having cryosorption property, oxidation reduction property and dual functional acidic and basic sites complexation are used, which have relatively high low-temperature activities and play an oxidation catalysis effect on the raw materials. At a relatively low temperature of 600 to 650° C., the catalyst is used in a reaction of catalytically cracking naphtha, resulting in a total yield of ethylene and propylene of up to 45.3% and achieving a better technical effect.

The relevant catalyst is checked and evaluated with naphtha as the raw material (see Table 1 for specific indices). The reaction temperature ranges from 600 to 650° C., the load of the catalyst is from 0.5 to 2 g naphtha/g catalyst h, and the weight ratio of water to naphtha is 1.5 to 3:1. The internal diameter of the fluid-bed reactor is 39 mm, and the reaction pressure is from 0 to 0.2 MPa.

TABLE 1

Indices of the naphtha raw material

| Items | Data |
| --- | --- |
| Density (at 20° C.) kg/m$^3$ | 704.6 |
| Distillation range Initial distillation range ° C. | 40 |
| Final distillation range ° C. | 160 |
| Saturated vapor pressure (at 20° C.) kPa | 50.2 |
| Paraffin % (by weight) | 65.2 |
| N-paraffin % | 32.5 |
| Cycloparaffin % | 28.4 |
| Olefin % (by weight) | 0.17 |
| Aromatic hydrocarbon % (by weight) | 6.2 |

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Example 1

5.89 g bismuth nitrate was measured, and dissolved in 10 ml 1:1 concentrated nitric acid to produce a yellow solution. 30 g ammonium molybdate was measured and dissolved in 200 ml water. The ammonium molybdate aqueous solution was then added into the bismuth nitrate solution. The resultant mixed solution was stirred to prepare solution (I).

3 g ammonium metavanadate was measured and added in 100 ml water. Then, 2 ml 80% phosphoric acid was dripped and 3 g oxalic acid was added into the mixture of ammonium metavanadate and water. The resultant mixture was heated till ammonium metavanadate was completely dissolved, thus to prepare solution (II).

7.86 g cobalt nitrate, 5.58 g cerium nitrate and 6.72 g calcium nitrate were measured and dissolved in 250 ml water to prepare solution (III).

Solutions (I), (II) and (III) were mixed. The mixed solution was heated and stirred in a water bath at a temperature of 70 to 80° C. 26 g silica was measured and added into the mixed solution. The resultant solution was refluxed for 5 hours, and dried with a spray drier for shaping. The resultant powder was sieved, and put into a muffle furnace. The temperature was then elevated to 740° C. The powder was sintered for 5 hours. After it was cooled, the catalyst was sieved.

The resultant catalyst was represented by the chemical formula: $Mo_{1.0}Bi_{0.07}V_{0.15}Co_{0.16}Ca_{0.17}Ce_{0.08}O_x$+30.6% support.

The activities of the catalyst were evaluated under the following conditions: a fluid-bed reactor having an internal diameter of 39 mm, a reaction temperature of 650° C., a pressure of 0.15 MPa, a weight ratio of water to naphtha of 3:1, a loading amount of the catalyst of 20 g, and a load of 1 g naphtha/g catalyst·h. The gaseous products were gathered for gas chromatography. The product distribution is shown in Table 2.

TABLE 2

Distribution of main cracked products and yields of ethylene and propylene

| Products | Amounts (% by weight) |
| --- | --- |
| Methane | 18.32 |
| Ethane | 3.54 |
| Ethylene | 33.47 |
| Propane | 0.56 |
| Propylene | 13.53 |
| $C_4$ | 4.57 |
| Conversion | 87.5 |
| Ethylene yield | 31.53 |
| Propylene yield | 12.96 |
| Ethylene + propylene yield | 44.49 |

Example 2

Solutions (I) and (II) were prepared according to the steps described in Example 1. 10.91 g ferric nitrate, 3.73 g nickel nitrate, 5.85 g lanthanium nitrate and 1.1 g potassium nitrate were measure and dissolved in 250 ml water, thus to prepare solution (III).

Solutions (I), (II) and (III) were mixed. The mixed solution was heated and stirred, and then 26 g aluminium oxide was added into the solution.

The resultant catalyst was represented by the chemical formula: $Mo_{1.0}Bi_{0.07}V_{0.15}Fe_{0.16}Ni_{0.08}K_{0.06}La_{0.08}O_x$+ 30.06% support.

The activities of the catalyst were evaluated under the conditions described in Example 1. The product distribution is shown in Table 3.

TABLE 3

Distribution of main cracked products and yields of ethylene and propylene

| Products | Amounts (% by weight) |
|---|---|
| Methane | 18.34 |
| Ethane | 2.05 |
| Ethylene | 38.32 |
| Propane | 0.28 |
| Propylene | 10.53 |
| $C_4$ | 3.31 |
| Conversion | 87.5 |
| Ethylene yield | 33.63 |
| Propylene yield | 9.38 |
| Ethylene + propylene yield | 43.01 |

Example 3

Solutions (I) and (II) were prepared according to the steps described in Example 1. 7.86 g cobalt nitrate, 1.68 g barium nitrate, 2.79 g cerium nitrate and 1.30 g potassium nitrate were measure and dissolved in 250 ml water, thus to prepare solution (III).

Solutions (I), (II) and (III) were mixed. The mixed solution was heated and stirred, and then 30 g silicon dioxide and 1.5 g aluminium oxide were added into the solution.

The resultant catalyst was represented by the chemical formula: $Mo_{1.0}Bi_{0.07}V_{0.15}Co_{0.16}Ba_{0.04}K_{0.04}Ce_{0.08}O_x$+ 37.5% support.

The activities of the catalyst were evaluated under the conditions described in Example 1. The yields of the products were as follows: an ethylene yield of 29.89%, a propylene yield of 7.37% and an ethylene+propylene yield of 37.25%.

Example 4

Solutions (I) and (II) were prepared according to the steps described in Example 1. 3.73 g cobalt nitrate, 3.10 g copper nitrate, 2.79 g cerium nitrate and 1.30 g potassium nitrate were measure and dissolved in 250 ml water, thus to prepare solution (III).

Solutions (I), (II) and (III) were mixed. The mixed solution was heated and stirred, and then 15 g silicon dioxide and 11 g H-ZSM-5 molecular sieve having a silica-alumina ratio of 150 were added into the solution.

The resultant catalyst was represented by the chemical formula: $Mo_{1.0}Bi_{0.07}V_{0.15}Co_{0.08}Cu_{0.08}K_{0.08}Ce_{0.04}O_x$+ 34.3% support. The activities of the catalyst were evaluated under the conditions described in Example 1 The yields of the products were as follows: an ethylene yield of 25.55%, a propylene yield of 16.73% and an ethylene+propylene yield of 42.28%.

Example 5

Solutions (I) and (II) were prepared according to the steps described in Example 1. 7.86 g cobalt nitrate, 0.8 g zinc nitrate and 5.85 g lanthanium nitrate were measure and dissolved in 250 ml water, thus to prepare solution (III).

Solutions (I), (II) and (III) were mixed. The mixed solution was heated and stirred, and then 20 g silicon dioxide and 6 g H-mordenite having a silica-alumina ratio of 20 were added into the solution.

The resultant catalyst was represented by the chemical formula: $Mo_{1.0}Bi_{0.07}V_{0.15}Cu_{0.16}Zn_{0.2}La_{0.08}O_x$+32.7% support. The activities of the catalyst were evaluated under the conditions described in Example 1. The yields of the products were as follows: an ethylene yield of 28.57%, a propylene yield of 13.69% and an ethylene+propylene yield of 42.26%.

Example 6

Solutions (I) and (II) were prepared according to the steps described in Example 1. 7.86 g cobalt nitrate, 3.10 g copper nitrate and 5.85 g lanthanium nitrate were measure and dissolved in 250 ml water, thus to prepare solution (III).

Solutions (I), (II) and (III) were mixed. The mixed solution was heated and stirred, and then 18 g aluminium oxide and 8 g H-β zeolite having a silica-alumina ratio of 30 were added into the solution.

The resultant catalyst was represented by the chemical formula: $Mo_{1.0}Bi_{0.07}V_{0.15}Co_{0.16}Cu_{0.08}La_{0.08}O_x$+31.8% support. The activities of the catalyst were evaluated under the conditions described in Example 1. The yields of the products were as follows: an ethylene yield of 28.85%, a propylene yield of 12.58% and an ethylene+propylene yield of 41.43%.

Example 7

Solutions (I) and (II) were prepared according to the steps described in Example 1. 7.86 g cobalt nitrate, 6.39 g chromium nitrate, 5.86 g cerium nitrate and 2.60 g potassium nitrate were measure and dissolved in 250 ml water, thus to prepare solution (III).

Solutions (I), (II) and (III) were mixed. The mixed solution was heated and stirred, and then 18 g aluminium oxide and 8 g H-ZSM-5 molecular sieve having a silica-alumina ratio of 40 were added into the solution.

The resultant catalyst was represented by the chemical formula: $Mo_{1.0}Bi_{0.07}V_{0.15}Cu_{0.16}Cr_{0.09}K_{0.15}Ce_{0.08}O_x$+30.6% support. The activities of the catalyst were evaluated under the conditions described in Example 1. The yields of the products were as follows: an ethylene yield of 33.74%, a propylene yield of 10.37% and an ethylene+propylene yield of 44.01%.

Example 8

Solutions (I) and (II) were prepared according to the steps described in Example 1. 10.91 g ferric nitrate, 0.80 g zinc nitrate and 2.2 g lanthanium oxide were measure and dissolved in 250 ml water. An appropriate amount of nitric acid was dripped into the mixture till the precipitates were completely dissolved, thus to prepare solution (III).

Solutions (I), (II) and (III) were mixed. The mixed solution was heated and stirred, and then 10 g silicon dioxide, 1 g aluminium oxide, 10 g H-ZSM-5 molecular sieve having a silica-alumina ratio of 200, and 5 g H-mordenite having a silica-alumina ratio of 30 were added into the solution.

The resultant catalyst was represented by the chemical formula: $Mo_{1.0}Bi_{0.07}V_{0.15}Fe_{0.16}Zn_{0.02}La_{0.08}O_x$+33.0% support. The activities of the catalyst were evaluated under the conditions described in Example 1. The yields of the products were as follows: an ethylene yield of 32.29%, a propylene yield of 8.22% and an ethylene+propylene yield of 40.51%.

Example 9

3 g ammonium metavanadate was measured and added in 100 ml water. Then, 2 ml 80% phosphoric acid was dripped and 3 g oxalic acid was added into the mixture of ammonium metavanadate and water. The resultant mixture was heated till ammonium metavanadate was completely dissolved, thus to prepare solution (I).

30 g ammonium molybdate, 7.61 g ferric nitrate, 10.88 g chromium nitrate and 4.08 g lanthanium nitrate were measured and dissolved in 250 ml water to prepare solution (II). 2.24 g diammonium phosphate was dissolved in 100 ml water. After the diammonium phosphate aqueous solution was added into solution (II), precipitates were generated.

Solution (I) was added into solution (II). The mixed solution was heated and stirred in a water bath at a temperature of 70 to 80° C. 16 g silicon dioxide, 2 g aluminium oxide, 8 g H-MCM-22 molecular sieve having a silica-alumina ratio of 40 and 7 g H-β zeolite having a silica-alumina ratio of 30 were measured and added into the mixed solution. The resultant mixture were refluxed for 5 hours and dried with a spray drier for shaping.

The resultant powder was sieved and put into a muffle furnace. Then the temperature was elevated to 740° C. The powder was sintered for 5 hours. After it was cooled, the catalyst was ground into powder in a grinder and passed through a 100-mesh sieve.

The resultant catalyst was represented by the chemical formula: $Mo_{1.0}V_{0.15}P_{0.10}Fe_{0.11}Cr_{0.16}La_{0.06}O_x$+34.1% support.

The activities of the catalyst were evaluated under the following conditions: a fluid-bed reactor having an internal diameter of 39 mm, a reaction temperature of 650° C., a pressure of 0.15 MPa, a weight ratio of water to naphtha of 3:1, a loading amount of the catalyst of 20 g, and a load of 1 g naphtha/g catalyst·h. The gaseous products were gathered for gas chromatography. The product distribution is shown in Table 4.

TABLE 4

Distribution of main gas phrase products and yields of ethylene and propylene

| Products | Amounts ($H_2$: % by volume; others: % by weight) |
|---|---|
| Hydrogen gas (% by volume) | 16.3 |
| Methane | 14.2 |
| Ethane | 2.10 |
| Ethylene | 32.24 |
| Propane | 0.51 |
| Propylene | 15.83 |
| $C_4$ | 3.46 |
| Others | 15.20 |
| Conversion | 85.13 |
| Ethylene yield | 30.27 |
| Propylene yield | 14.88 |
| Ethylene + propylene yield | 45.15 |

Example 10

284 g sodium metasilicate was measured and dissolved in 300 g distilled water to prepare solution A. 33.3 g aluminium sulphate was measured and dissolved in 100 g distilled water to prepare solution B. Solution B was slowly added into solution A. The mixed solution was stirred intensely. Then, 24.4 g ethylene diamine was added into the mixed solution. After stirring for some time, dilute sulphuric acid was added into the mixed solution to adjust the pH to 11.5. The mol proportion of the sol was controlled such that Si:Al:ethylene diamine:$H_2O$ is 1:0.1:0.4:40. The mixed solution was put into an autoclave and kept at a temperature of 180° C. for 40 hours. Then, it was taken out, washed with water, dried and sintered to produce a composite molecular sieve composed of ZSM-5 and mordenite. An ammonium nitrate solution having a concentration of 5% was used for interchange at 70° C. twice, and then sintering was carried out. The interchanging and sintering steps were repeated twice to produce a H-ZSM-5/mordenite composite molecular sieve.

Solution (I) was prepared according to the steps described in Example 9.

30 g ammonium molybdate, 7.61 g ferric nitrate, 5.88 g zinc nitrate and 5.60 g cerium nitrate were measured and dissolved in 250 ml water to prepare solution (II). 2.24 g diammonium phosphate was dissolved in 100 ml water. The diammonium phosphate aqueous solution was added into solution (II), and then, solution (I) was added into solution (II). The mixed solution was heated and stirred in a water bath at a temperature of 70 to 80° C. 16 g silicon dioxide, 2 g aluminium oxide, and 18 g H-ZSM-5/mordenite composite molecular sieve having a silica-alumina ratio of 20, which was prepared above, were then added into the mixed solution.

The resultant catalyst was represented by the chemical formula: $Mo_{1.0}V_{0.15}P_{0.10}Fe_{0.11}Zn_{0.12}Ce_{0.08}O_x$+37.8% support.

The activities of said catalyst were evaluated under the conditions described in Example 9. The product distribution and the yields of ethylene and propylene are shown in Table 5.

TABLE 5

Distribution of main gas phrase products and yields of ethylene and propylene

| Products | Amounts ($H_2$: % by volume; others: % by weight) |
|---|---|
| Hydrogen gas (% by volume) | 15.86 |
| Methane | 13.47 |
| Ethane | 2.03 |
| Ethylene | 32.65 |
| Propane | 0.45 |
| Propylene | 15.33 |
| $C_4$ | 6.58 |
| Others | 13.11 |
| Conversion | 84.34 |
| Ethylene yield | 30.86 |
| Propylene yield | 14.53 |
| Ethylene + propylene yield | 45.39 |

Example 11

284 g sodium metasilicate was measured and dissolved in 300 g distilled water to prepare solution A. 33.3 g aluminium sulphate was measured and dissolved in 100 g distilled water to prepare solution B. Solution B was slowly added into solution A. The mixed solution was stirred intensely. Then, 24.4 g ethylene diamine was added into the mixed solution. After stirring for some time, dilute sulphuric acid was added into the mixed solution to adjust the pH to about 11.5 g Y zeolite crystal seed was added into the mixed solution. The mol proportion of the sol was controlled such that Si:Al:

ethylene diamine:H$_2$O is 1:0.1:0.4:40. The mixed solution was put into an autoclave and kept at a temperature of 170° C. for 36 hours. Then, it was taken out, washed with water, dried and sintered to produce a composite molecular sieve composed of ZSM-5 and Y zeolite. An ammonium nitrate solution having a concentration of 5% was used for interchange at 70° C. twice, and then sintering was carried out. The interchanging and sintering steps were repeated twice to produce a H-ZSM-5/Y zeolite composite molecular sieve.

Solution (I) was prepared according to the steps described in Example 9.

30 g ammonium molybdate, 7.61 g ferric nitrate, 7.29 g nickel nitrate, 5.60 g lanthanum nitrate and 5.18 g calcium nitrate were measured and dissolved in 250 ml water to prepare solution (II). 2.24 g diammonium phosphate was dissolved in 100 ml water. The diammonium phosphate aqueous solution was added into solution (II), and then, solution (I) was added into solution (II). The mixed solution was heated and stirred in a water bath at a temperature of 70 to 80° C. 16 g silicon dioxide, 2 g aluminium oxide, and 18 g H-ZSM-5/Y zeolite composite molecular sieve having a silica-alumina ratio of 20, which was prepared above, were then added into the mixed solution.

The resultant catalyst was represented by the chemical formula: $Mo_{1.0}V_{0.15}P_{0.10}Fe_{0.11}Ni_{0.15}Ca_{0.13}La_{0.08}O_x$+35.2% support.

The activities of said catalyst were evaluated under the conditions described in Example 9. The yields of the products were as follows: an ethylene yield of 25.97%, a propylene yield of 15.52% and an ethylene+propylene yield of 41.49%.

Example 12

284 g sodium metasilicate was measured and dissolved in 300 g distilled water to prepare solution A. 33.3 g aluminium sulphate was measured and dissolved in 100 g distilled water to prepare solution B. Solution B was slowly added into solution A. The mixed solution was stirred intensely. Then, 24.4 g ethylene diamine and 10 g tetraethyl ammonium hydroxide were added into the mixed solution. After stirring for some time, dilute sulphuric acid was added into the mixed solution to adjust the pH to about 12.5 g β zeolite crystal seed was added into the mixed solution. The mol proportion of the sol was controlled such that Si:Al:ethylene diamine:H$_2$O is 1:0.1:0.4:40. The mixed solution was put into an autoclave and kept at a temperature of 160° C. for 40 hours. Then, it was taken out, washed with water, dried and sintered to produce a composite molecular sieve composed of mordenite and P zeolite. An ammonium nitrate solution having a concentration of 5% was used for interchange at 70° C. twice, and then sintering was carried out. The interchanging and sintering steps were repeated twice to produce a mordenite/β zeolite composite molecular sieve.

Solution (I) was prepared according to the steps described in Example 9.

30 g ammonium molybdate, 7.61 g ferric nitrate, 7.29 g nickel nitrate, 5.44 g cerium nitrate and 6.30 g copper nitrate were measured and dissolved in 250 ml water to prepare solution (II). 2.24 g diammonium phosphate was dissolved in 100 ml water. The diammonium phosphate aqueous solution was added into solution (II), and then, solution (I) was added into solution (II). The mixed solution was heated and stirred in a water bath at a temperature of 70 to 80° C. 16 g silicon dioxide, 2 g aluminium oxide, and 18 g mordenite/β zeolite composite molecular sieve having a silica-alumina ratio of 20, which was prepared above, were then added into the mixed solution.

The resultant catalyst was represented by the chemical formula: $Mo_{1.0}V_{0.15}P_{0.10}Fe_{0.11}Ni_{0.15}Cu_{0.15}Ce_{0.07}O_x$+35.2% support.

The activities of said catalyst were evaluated under the conditions described in Example 9. The yields of the products were as follows: an ethylene yield of 29.53%, a propylene yield of 12.69% and an ethylene+propylene yield of 42.22%.

Example 13

Solution (I) was prepared according to the steps described in Example 9.

30 g ammonium molybdate, 5.49 g cobalt nitrate, 5.60 g zinc nitrate, 5.44 g cerium nitrate and 1.10 g potassium nitrate were measured and dissolved in 250 ml water to prepare solution (II). 2.24 g diammonium phosphate was dissolved in 100 ml water. The diammonium phosphate aqueous solution was added into solution (II), and then, solution (I) was added into solution (II). The mixed solution was heated and stirred in a water bath at a temperature of 70 to 80° C. 14 g silicon dioxide, 2 g aluminium oxide, 12 g H-ZSM-5/mordenite composite molecular sieve having a silica-alumina ratio of 20, which was prepared above, and 8 g H-ZSM-5 molecular sieve having a silica-alumina ratio of 150 were then added into the mixed solution.

The resultant catalyst was represented by the chemical formula: $Mo_{1.0}V_{0.15}P_{0.10}Co_{0.11}Zn_{0.11}K_{0.06}Ce_{0.07}O_x$+36.7% support.

The activities of said catalyst were evaluated under the conditions described in Example 9. The yields of the products were as follows: an ethylene yield of 36.53%, a propylene yield of 8.59% and an ethylene+propylene yield of 45.12%.

Example 14

Solution (I) was prepared according to the steps described in Example 9.

30 g phospho-molybdic acid, 5.89 g bismuth nitrate, 5.49 g cobalt nitrate, 5.32 g nickel nitrate, 5.44 g cerium nitrate and 10.81 g 50% manganese nitrate solution were measured and dissolved in 250 ml water to prepare solution (II). 2.24 g diammonium phosphate was dissolved in 100 ml water. The diammonium phosphate aqueous solution was added into solution (II), and then, solution (I) was added into solution (II). The mixed solution was heated and stirred in a water bath at a temperature of 70 to 80° C. 30 g silicon dioxide and 2 g aluminium oxide were then added into the mixed solution.

The resultant catalyst was represented by the chemical formula: $Mo_{1.0}Bi_{0.07}V_{0.13}P_{0.17}Co_{0.1}Ni_{0.1}Mn_{0.16}Ce_{0.07}O_x$+30.3% support.

The activities of said catalyst were evaluated under the conditions described in Example 9. The yields of the products were as follows: an ethylene yield of 36.12%, a propylene yield of 6.67% and an ethylene+propylene yield of 42.79%.

Example 15

Mixed solution (I) and diammonium phosphate-containing mixed solution (II) were prepared according to the steps described in Example 14. Said mixed solution was heated and stirred in a water bath at a temperature of 70 to 80° C. 36 g H-ZSM-5 molecular sieve having a silica-alumina ratio of 150 were added into the mixed solution. After shaping by the same method, a catalyst was obtained, which was represented by the chemical formula: $Mo_{1.0}Bi_{0.07}V_{0.13}P_{0.17}Co_{0.1}Ni_{0.1}Mn_{0.16}Ce_{0.07}O_x$+30.3% support.

The activities of said catalyst were evaluated under the conditions described in Example 9. In the resultant products, the ethylene yield was 36.54%, the propylene yield was 7.84%, and the total yield of ethylene and propylene was 44.38%.

Example 16

Mixed solution (I) and diammonium phosphate-containing mixed solution (II) were prepared according to the steps described in Example 14. Said mixed solution was heated and stirred in a water bath at a temperature of 70 to 80° C. 36 g H-ZSM-5/mordenite composite molecular sieve having a silica-alumina ratio of 30 were added into the mixed solution. After shaping by the same method, a catalyst was obtained, which was represented by the chemical formula: $Mo_{1.0}Bi_{0.07}V_{0.13}P_{0.17}Co_{0.1}Ni_{0.1}Mn_{0.16}Ce_{0.07}O_x$+30.3% support.

The activities of said catalyst were evaluated under the conditions described in Example 9. In the resultant products, the ethylene yield was 37.27%, the propylene yield was 8.24%, and the total yield of ethylene and propylene was 45.51%.

Example 17

A mixed solution was prepared according to the steps described in Example 1.5 g H-ZSM-5 molecular sieve having a silica-alumina ratio of 150 and 10 g silicon dioxide were added as support into the mixed solution. A catalyst represented by the chemical formula $Mo_{1.0}Bi_{0.07}V_{0.15}Co_{0.16}Ca_{0.17}Ce_{0.08}O_x$+20.2% support was prepared according to the same method. It was checked and evaluated by the method described in Example 1. The results are shown in Table 6", which is at the first line of the page 19 of the description, to "The ethylene yield was 15.25%, the propylene yield was 30.68% and the total yield of ethylene and propylene was 45.93%.

Example 18

A mixed solution was prepared according to the steps described in Example 1. 500 g distilled water was added to dilute the mixed solution. 60 g H-ZSM-5/mordenite composite molecular sieve having a silica-alumina ratio of 20, 100 g H-ZSM-5 molecular sieve having a silica-alumina ratio of 200, 40 g β zeolite having a silica-alumina ratio of 30 and 22 g silicon dioxide were added into the diluted mixed solution. A catalyst represented by the chemical formula $Mo_{1.0}Bi_{0.07}V_{0.15}Co_{0.16}Ca_{0.17}Ce_{0.08}O_x$+79.2%. support was prepared according to the method described in Example 1. It was checked and evaluated by the method described in Example 1. The ethylene yield was 14.43%, the propylene yield was 32.17% and the total yield of ethylene and propylene was 46.60%.

Example 19

The catalyst prepared in Example 1 was used. Light diesel oil having a boiling point of lower than 350° C. was used as reaction material. Evaluation was carried out under the conditions described in Example 1. The ethylene yield was 29.14%, the propylene yield was 10.55% and the total yield of ethylene and propylene was 39.69

Example 20

The catalyst prepared in Example 1 was used. Mixed $C_4$ (paraffin:olefin=1:1) was used as reaction material. Evaluation was carried out under the following conditions: a temperature of 550° C., a water/oil ratio of 3:1 and a space velocity the same as the space velocity described in Example 1. The ethylene yield was 12.73%, the propylene yield was 39.13% and the total yield of ethylene and propylene was 51.86%.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for preparation of ethylene and propylene by catalytic cracking in a fluid bed, said method uses a fluid-bed catalyst and comprises the steps of:
   providing a catalyst support, and
   providing a composition of the following chemical formula based on stoichiometric ratio:

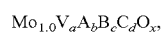

$Mo_{1.0}V_aA_bB_cC_dO_x$, selecting A from at least one element of Groups VIII, IB, IIB, VIIB, VIB, IA and IIA;
   selecting B from at least one of rare earth elements;
   selecting C from at least one of Bi and P;
   wherein a is from 0.01 to 0.5;
   b is from 0.01 to 0.5;
   c is from 0.01 to 0.5;
   d is from 0 to 0.5; and
   X represents the total number of oxygen atoms that meets the valances of the elements in the catalyst,
   wherein the catalyst support is at least one of a composite molecular sieve, or a mixture of
   1) at least one the composite molecular sieve, and
   2) at least one selected from $SiO_2$ and $Al_2O_3$,
   and further comprising the steps of:
   selecting the composite molecular sieve from least one of ZSM-5, Y, β, MCM-22, SAPO-34 and mordenite, and
   growing the composite molecular sieve, which is a composite, together from at least two molecular sieves of ZSM-5, Y, β, MCM-22, SAPO-34 and mordenite, and using an amount of the catalyst support from 20 to 80% by weight on the basis of the weight of the catalyst
   wherein a raw material, naphtha, is reacted with the catalyst at a temperature from 600° C.-650° C., with a load of the catalyst being from 0.5 to 2 g naphtha/g catalyst*h, the weight ratio of water to naphtha being from 1.5 to 3:1, and a reaction pressure being from 0-0.2 MPa.

2. The method according to claim 1 for preparation of ethylene and propylene by catalytic cracking in a fluid bed, wherein a is from 0.01 to 0.3, b is from 0.01 to 0.3, c is from 0.01 to 0.3 and d is from 0.01 to 0.3.

3. The method according to claim 1 for preparation of ethylene and propylene by catalytic cracking in a fluid bed, further comprising the steps of:
   selecting the element of Group VIII from at least one of Fe, Co and Ni,
   selecting the element of Group IB from at least one of Cu and Ag,
   selecting the element of Group IIB is Zn,
   selecting the element of Group VIIB from at least one of Mn and Re,
   selecting the element of Group VIB from at least one of Cr, Mo and W,
   selecting the element of Group IA from at least one of Li, Na and K, and selecting the element of Group IIA from at least one of Ca, Mg, Sr and Ba.

4. The method according to claim 1 for preparation of ethylene and propylene by catalytic cracking in a fluid bed, further comprising the step of:
   selecting the rare earth element from at least one of La and Ce.

5. The method according to claim 1 for preparation of ethylene and propylene by catalytic cracking in a fluid bed, wherein the molecular sieve in the catalyst support is at least one of Y zeolite, mordenite and β zeolite, and the composite molecular sieve is at least one of ZSM-5/mordenite, ZSM-5/Y zeolite and ZSM-5/β zeolite.

6. The method according to claim 5 for preparation of ethylene and propylene by catalytic cracking in a fluid bed, wherein the silica-alumina mol ratios, $SiO_2/Al_2O_3$, of said molecular sieve and said composite molecular sieve are from 10 to 500.

7. The method according to claim 6 for preparation of ethylene and propylene by catalytic cracking in a fluid bed, wherein the silica-alumina mol ratios, $SiO_2/Al_2O_3$, of said molecular sieve and said composite molecular sieve are from 20 to 300.

8. The method according to claim 1 for preparation of ethylene and propylene by catalytic cracking in a fluid bed, wherein the amount of the catalyst support as used is from 30 to 50% by weight on the basis of the weight of the catalyst.

9. The method according to claim 1 for preparation of ethylene and propylene by catalytic cracking in a fluid bed, wherein when Cr is a component of the catalyst, the ratio of Mo:Cr is 1:0.01 to 0.5 based on stoichiometric ratio.

* * * * *